(12) United States Patent
Han

(10) Patent No.: US 11,885,527 B2
(45) Date of Patent: Jan. 30, 2024

(54) AIR PURIFICATION DEVICE

(71) Applicant: KHANFILTER, INC., Daejeon (KR)

(72) Inventor: Dae Gon Han, Daejeon (KR)

(73) Assignee: KHANFILTER, INC., Daejeon (KR)

(*) Notice: Subject to any disclaimer, the term of this patent is extended or adjusted under 35 U.S.C. 154(b) by 499 days.

(21) Appl. No.: 17/268,858

(22) PCT Filed: Jul. 17, 2019

(86) PCT No.: PCT/KR2019/008817
§ 371 (c)(1),
(2) Date: Feb. 16, 2021

(87) PCT Pub. No.: WO2020/040430
PCT Pub. Date: Feb. 27, 2020

(65) Prior Publication Data
US 2021/0231322 A1    Jul. 29, 2021

(30) Foreign Application Priority Data

Aug. 20, 2018  (KR) .................. 10-2018-0096754
May 8, 2019   (KR) .................. 10-2019-0053383
May 8, 2019   (KR) .................. 10-2019-0053384

(51) Int. Cl.
*F24F 8/10*        (2021.01)
*F24F 13/28*       (2006.01)
(Continued)

(52) U.S. Cl.
CPC ............... *F24F 8/10* (2021.01); *F24F 13/28* (2013.01); *F24F 7/06* (2013.01); *F24F 11/70* (2018.01); *F24F 2012/007* (2013.01)

(58) Field of Classification Search
CPC ........ B01D 46/00; B01D 53/00; B01D 53/26; B01D 53/86; F24F 7/06; F24F 11/0001;
(Continued)

(56) References Cited

U.S. PATENT DOCUMENTS

2020/0269177 A1*  8/2020  Han .................. B01D 46/0027

FOREIGN PATENT DOCUMENTS

JP        05-240027 A      9/1993
JP        2679422 B2      11/1997
(Continued)

*Primary Examiner* — Sharon Pregler
(74) *Attorney, Agent, or Firm* — NKL LAW; Jae Youn Kim

(57) ABSTRACT

The present invention relates to an air purification device. The housing includes a main passage section through which air is introduced from a room through a main inlet port and is discharged to an outside through a main outlet port, and a bypass passage section partitioned from the main passage section, through which air is introduced from the room through a bypass inlet port and is discharged to an outside through a bypass outlet port. The main inlet port damper opens and closes the main inlet port. The main outlet port damper opens and closes the main outlet port. The bypass damper opens and closes the bypass passage section. The controller is configured to control the bypass damper so as to open the bypass passage section when the main passage section is closed due to a malfunction of the main inlet port damper or the main outlet port damper.

7 Claims, 14 Drawing Sheets

(51) Int. Cl.
*F24F 11/70* (2018.01)
*F24F 7/06* (2006.01)
*F24F 12/00* (2006.01)

(58) Field of Classification Search
CPC .. F24F 11/39; F24F 11/61; F24F 11/79; F24F 13/08; F24F 13/28; F24F 8/10; F24F 8/167; F24F 8/90
See application file for complete search history.

(56) References Cited

FOREIGN PATENT DOCUMENTS

| | | | |
|---|---|---|---|
| JP | 2871299 B2 | 3/1999 | |
| KR | 10-2006-0018557 A | 3/2006 | |
| KR | 10-1550261 B1 | 9/2015 | |
| KR | 10-2017-0063088 A | 6/2017 | |
| KR | 20170121111 A | * 10/2017 | .............. F24F 11/34 |
| KR | 10-2017-0121111 A | 11/2017 | |
| KR | 10-1799090 B1 | 12/2017 | |

* cited by examiner

AIR PURIFICATION DEVICE

TECHNICAL FIELD

The present invention relates to an air purification device which is communicated with ducts to purify air from a room by collecting foreign matters in contaminated air, and then discharge the purified air to an outside.

BACKGROUND ART

In general, homes or restaurants are basically equipped with an air conditioning system for forcibly sucking contaminated air from a room and discharging it to an outside. Specifically, the contaminated air in the room is sucked through a hood mounted above a cooking table, or an exhaust fan mounted on a ceiling or wall, and the sucked contaminated air is discharged to the outside through a duct. For example, there is a technique relating to the air conditioning system as disclosed in Korean Patent Registration Publication No. 10-1550261 (published on Nov. 14, 2014).

Meanwhile, an air purification device, in which multiple plate type filters such as a pre-filter, a carbon filter, and a HEPA (High Efficiency Particulate Air) filter are sequentially arranged, is installed inside the duct, and is configured to remove foreign matters contained in the sucked contaminated air.

However, when reviewing various filters having the above-described configuration, a filter type air purification device installed inside the existing duct tends to more focus on filtering dust and the like contained in the contaminated air. According to such a filter type air purification device, it can be seen that purification of soot, odors, bacteria, etc. contained in the contaminated air is not performed. In addition, since the filter should be regularly cleaned and replaced, the filter type air purification device requires a lot of costs for maintenance, and when the cleaning condition is poor, air purifying efficiency is rapidly deteriorated.

SUMMARY OF INVENTION

Problems to be Solved by Invention

It is an object of the present invention to provide an air purification device, in which even when a main passage section accommodating a filter is abnormally closed, it is possible to cope with the situation so as to immediately discharge indoor air to an outside.

Another object of the present invention is to provide an air purification device, in which even if a clogging phenomenon of a filter occurs, it is possible to cope with the situation.

Means for Solving Problems

To achieve the above-described objects, according to an aspect of the present invention, there is provided an air purification device including a housing, a main inlet port damper, a main outlet port damper, a bypass damper, a filter, a heater, a regenerative circulation pipe, a circulation fan, and a controller. The housing includes a main passage section through which air is introduced from a room through a main inlet port and is discharged to an outside through a main outlet port, and a bypass passage section partitioned from the main passage section, through which air is introduced from the room through a bypass inlet port and is discharged to an outside through a bypass outlet port. The main inlet port damper is configured to open and close the main inlet port. The main outlet port damper is configured to open and close the main outlet port. The bypass damper is configured to open and close the bypass passage section. The filter is disposed within the main passage section. The heater is configured to heat the filter. The regenerative circulation pipe has both ends which are respectively disposed on the main inlet port side and the main outlet port side to communicate with the main passage section. The circulation fan is installed in the regenerative circulation pipe to blow air in the regenerative circulation pipe into the main passage section. The controller is configured to control the bypass damper so as to open the bypass passage section when the main passage section is closed due to a malfunction of the main inlet port damper or the main outlet port damper.

According to another aspect of the present invention, there is provided an air purification device including a housing, a filter, a heater, an inlet pipe damper, an outlet pipe damper, a backwash intake port, an intake port damper, a backwash pipe, a backwash pipe damper, and a controller. The housing includes: a passage section through which air is introduced from a room through an inlet pipe by an exhaust fan and is discharged to an outside through an outlet pipe, wherein the passage section has a filter mounting space, an inlet space communicated with the inlet pipe on one side of the filter mounting space, and an outlet space communicated with the outlet pipe on the other side of the filter mounting space, and a backwash intake port formed on the outlet space side. The filter is mounted in the filter mounting space of the passage section. The heater is configured to heat the filter. The inlet pipe damper is configured to open and close an outlet of the inlet pipe. The outlet pipe damper is configured to open and close an inlet of the outlet pipe. The intake port damper is configured to open and close the backwash intake port. The backwash pipe has one end which is communicated with the inlet space of the passage section, and the other end which is communicated with the outlet pipe. The backwash pipe damper is configured to open and close an inlet of the backwash pipe. The controller is configured to control the inlet pipe damper and the outlet pipe damper to close the outlet of the inlet pipe and the inlet of the outlet pipe when a clogging phenomenon of the filter occurs, and in this state, control the intake port damper and the backwash pipe damper to open the backwash intake port and the inlet of the backwash pipe.

Additionally, the air purification device according to another aspect of the present invention may include a bypass pipe of which one end is communicated with the inlet pipe and the other end is communicated with the backwash pipe, and a bypass damper configured to open and close the bypass pipe. Herein, the controller may selectively control the bypass damper to open the bypass pipe, when the clogging phenomenon of the filter occurs.

Advantageous Effects

According to the present invention, even when the main passage section is abnormally closed due to the malfunction of the main inlet port damper or the main outlet port damper, it is possible to cope with the situation so as to immediately discharge indoor air to an outside. Therefore, when employing the air purification device according to the present invention in a restaurant, a damage may be minimized by immediately enabling restaurant business to continue by preventing the restaurant business from being suspended until the main inlet port damper or the main outlet port damper is repaired.

According to the present invention, even if a clogging phenomenon of the filter occurs, the filter may be reused by resolving the clogging phenomenon of the filter, and thus, a troublesome work for frequently replacing the filter may be reduced.

According to the present invention, even in a situation in which the clogging phenomenon of the filter is not resolved even when it is subjected to backwashing, or the passage section accommodating the filter is abnormally closed due to the malfunction of the inlet pipe damper or the outlet pipe damper, it is possible to cope with the situation so as to immediately discharge the indoor air to the outside.

MODE FOR CARRYING OUT INVENTION

Figure 1:
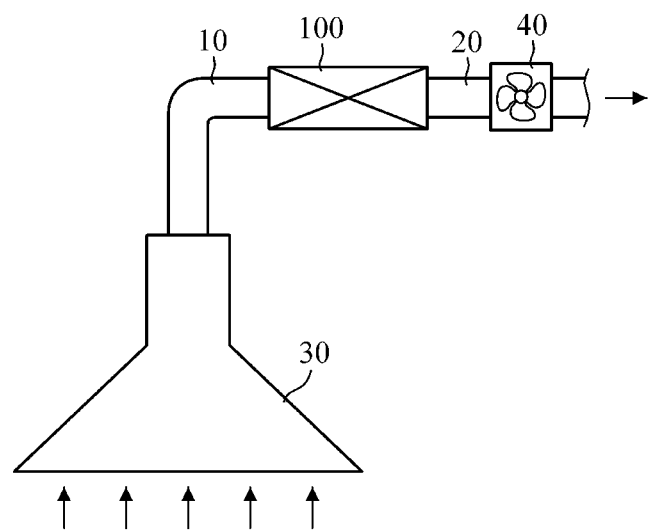
FIG. 1 is a configuration view illustrating an example in which an inlet duct and an outlet duct are employed in an air purification device according to a first embodiment of the present invention.

Hereinafter, the present invention will be described in detail with reference to the accompanying drawings. Herein, same reference numerals will be denoted to the same configurations, and repeated descriptions as well as the publicly known functions and configurations that are judged to be able to make the purport of the present invention unnecessarily obscure will not be described in detail. Such examples are provided for completely describing the present invention to persons having ordinary knowledge and skills in the related art. Therefore, shapes and sizes of elements in the drawings may be exaggerated for clearer description.

FIG. 1 is a configuration view illustrating an example in which an inlet duct and an outlet duct are employed in an air purification device according to a first embodiment of the present invention.

As shown in FIG. 1, an air purification device 100 according to the first embodiment of the present invention is installed between an inlet duct 10 and an outlet duct 20. The air purification device 100 may suck and discharge contaminated air in a room through a hood 30 mounted above a countertop of a home or restaurant. At this time, a suction force is provided by an exhaust fan 40 installed in the outlet duct 20, and a movement passage is secured through the inlet duct 10 and the outlet duct 20, such that the sucked indoor air may be discharged to an outside.

The air purification device 100 according to the first exemplary embodiment of the present invention may remove foreign matters from the contaminated air introduced from a room through the inlet duct 10 to purify the air, and then discharge the purified air to the outside through the outlet duct 20. Of course, the air purification device 100 is usually installed and used on the air movement passage such as the inlet duct 10 and the outlet duct 20, but may also be installed and used in the room alone. The air purification device may suck and discharge contaminated air from the room through a ventilator mounted on a ceiling or wall.

Figure 2:
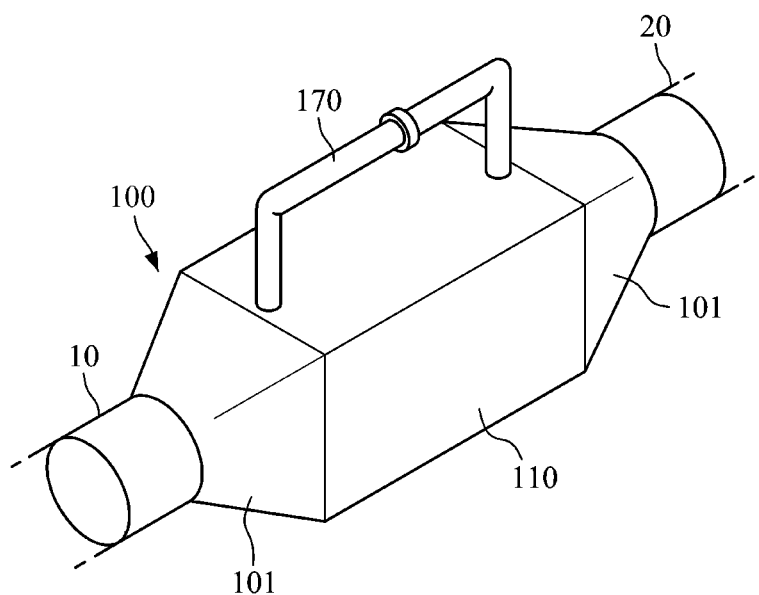
FIG. 2 is a perspective view illustrating the air purification device according to the first embodiment of the present invention.
Figure 3:
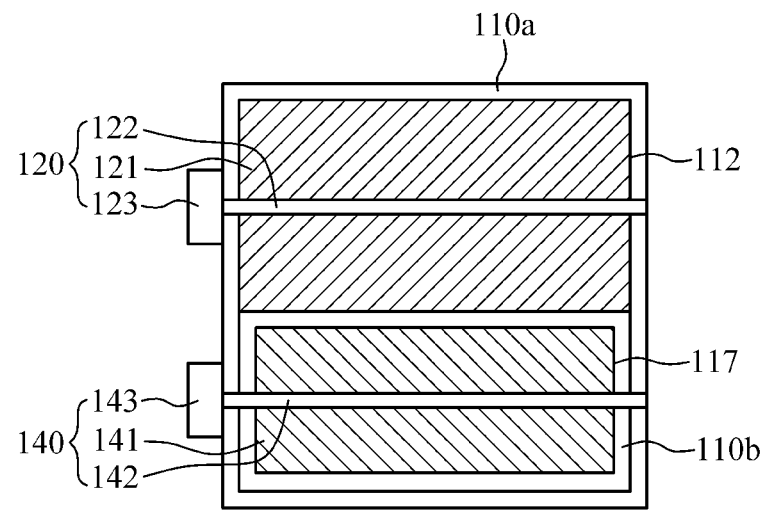
FIG. 3 is a side view illustrating a main inlet port and bypass inlet port side of the housing in FIG. 2.
Figure 4:
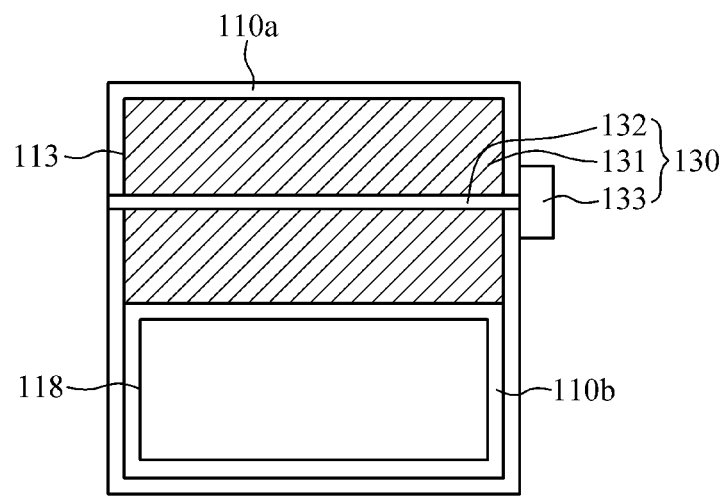
FIG. 4 is a side view illustrating a main outlet port and bypass outlet port side of the housing in FIG. 2.
Figure 5:
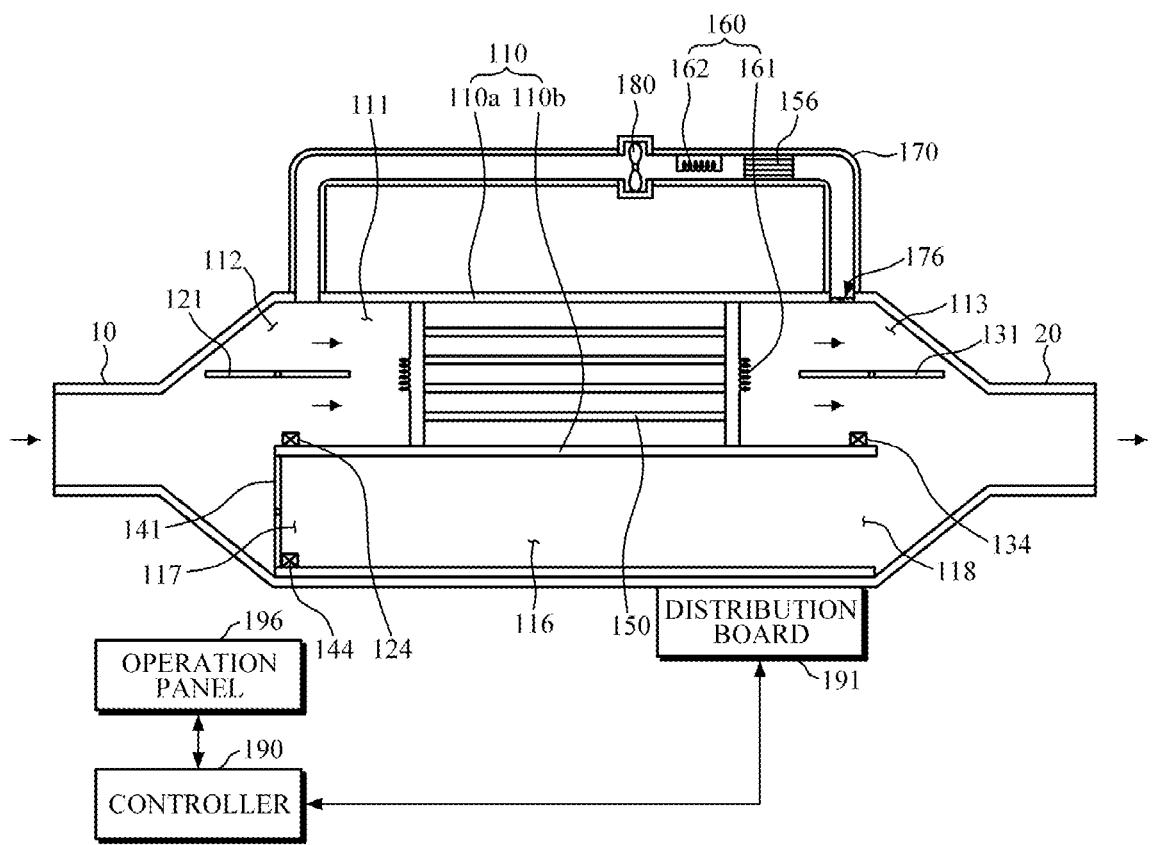
FIG. 5 is a cross-sectional view of the air purification device shown in FIG. 2 taken on a line in a length direction of the housing.
Figure 6:
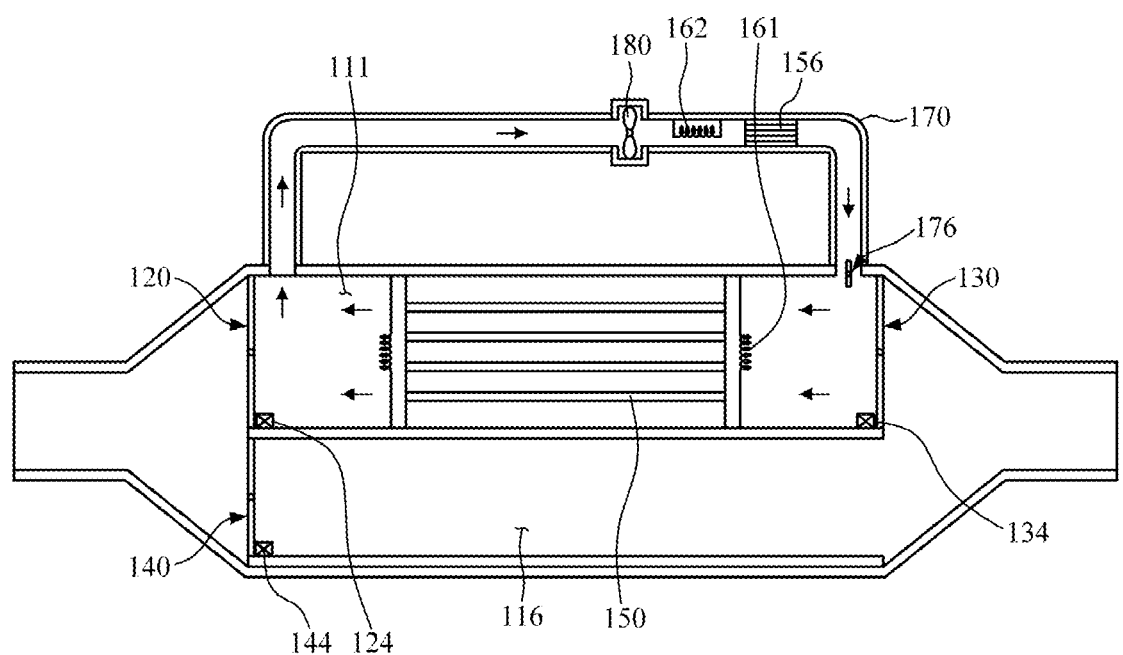
FIGS. 6 and 7 are cross-sectional views for describing an example of an operation of the air purification device in FIG. 5.
Figure 7:
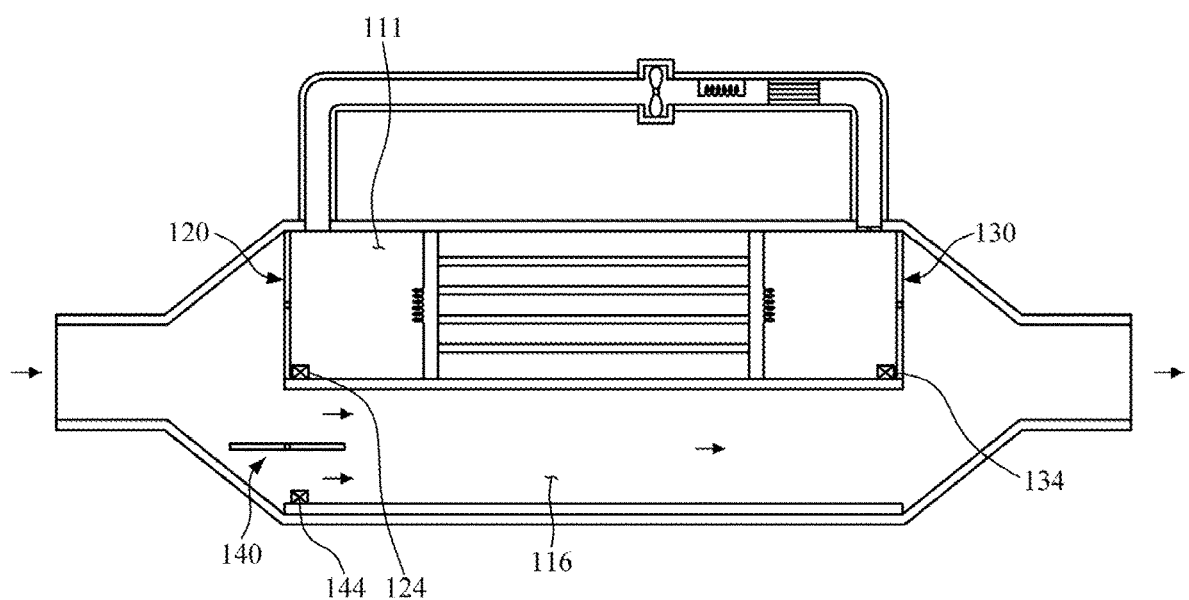
Figure 8:
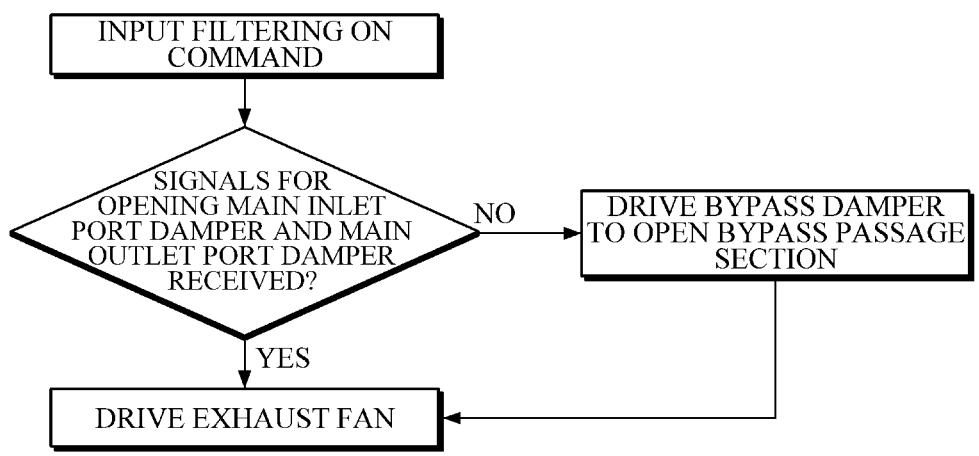
FIG. 8 is a flow chart for describing a procedure of a control method of the air purification device.

FIG. 2 is a perspective view illustrating the air purification device according to the first embodiment of the present invention, FIG. 3 is a side view illustrating a main inlet port and bypass inlet port side of the housing in FIG. 2, FIG. 4 is a side view illustrating a main outlet port and bypass outlet port side of the housing in FIG. 2, FIG. 5 is a cross-sectional view of the air purification device shown in FIG. 2 taken on a line in a length direction of the housing, FIGS. 6 and 7 are cross-sectional views for describing an example of an operation of the air purification device in FIG. 5, and FIG. 8 is a flow chart for describing a procedure of a control method of the air purification device.

Referring to FIGS. 2 to 8, the air purification device 100 according to the first embodiment of the present invention includes a housing 110, a main inlet port damper 120, a main outlet port damper 130, a bypass damper 140, a filter 150, a heater 160, a regenerative circulation pipe 170, a circulation fan 180, and a controller 190.

The housing 110 includes a main passage section 111 and a bypass passage section 116. Air introduced from the room through the main inlet port 112 passes through the main passage section 111, and then is discharged to the outside through the main outlet port 113. The main inlet port 112 is communicated with the inlet duct 10, such that contaminated air may be introduced. The main outlet port 113 is communicated with the outlet duct 20, such that the air purified by the filter 150 may be discharged to the outside.

The bypass passage section 116 is partitioned from the main passage section 111, and in this state, the air introduced from the room through the bypass inlet port 117 passes through the bypass passage section 116, and then is discharged to the outside through the bypass outlet port 118. The bypass inlet port 117 is communicated with the inlet duct 10, such that contaminated air may be introduced. The bypass outlet port 118 is communicated with the outlet duct 20, such that the contaminated air may be discharged as it is.

That is, an inner space of the housing 110 may be partitioned into the main passage section 111 and the bypass passage section 116 in the length direction. Further, in the housing 110, one opening connected to the inlet duct 10 is partitioned into a main inlet port 112 and a bypass inlet port 117, and the other opening connected to the outlet duct 20 may be partitioned into a main outlet port 113 and a bypass outlet port 118. Both openings of the housing 110 may be connected to the inlet duct 10 and the outlet duct 20 by connection pipes 101.

For example, the housing 110 may be formed in a form in which a bypass housing part 110b having a square cross section is installed in a main housing part 110a having a square cross section. Herein, the bypass housing part 110b may be accommodated in one space of the main housing part 110a, and the main passage section 111 may be formed in the other space. A bypass passage section 116 may be formed in the bypass housing part 110b. The main housing part 110a and the bypass housing part 110b may be made of the same material.

As another example, the bypass housing part 110b may be coupled to an outer wall of the main housing part 110a, or may be formed as a tube body, such that both ends thereof may be communicated with the main housing part 110a. As another example, the housing 110 may be configured to partition the inner space thereof into the main passage section 111 and the bypass passage section 116 by a housing partition wall. The housing partition wall may be made of the same material as the housing 110.

If a cross-sectional area of the bypass passage section 116 is smaller than respective cross-sectional areas of the inlet duct 10 and the outlet duct 20, an airflow speed is increased. As a result, an amount of air inflow from the room is increased, thereby reducing effects of cooling and heating the room, and causing a decrease in durability of a connection portion between the inlet duct 10 and the outlet duct 20 due to the increased vibration. However, when setting the cross-sectional area of the bypass passage section 116 to be equal to or larger than the respective cross-sectional areas of the inlet duct 10 and the outlet duct 20, it is possible to prevent a static pressure loss and prevent an increase in the airflow speed.

The main inlet port damper 120 is configured to open and close the main inlet port 112. The main inlet port damper 120 opens the main inlet port 112, thereby allowing the contaminated air to be introduced into the main passage section 111. The main inlet port damper 120 maintains the main inlet port 112 while being closed during the contaminated air is circulated and purified through the regenerative circulation pipe 170 in the main passage section 111.

The main inlet port damper 120 may include a damper blade 121 rotatably installed by a damper shaft 122 in the main inlet port 112, and may be configured to open and close an inlet passage by a damper rotation motor 123. Whether the damper blade 121 is opened or closed may be detected by a proximity sensor 124.

The proximity sensor 124 may include a Hall sensor and a permanent magnet, or may be optically configured to detect opening/closing positions of the damper blade 121 in a non-contact manner. The signal detected by the proximity sensor 124 may be input to the controller 190. The controller 190 may receive the signal detected by the proximity sensor 124 and control the damper rotation motor 123 to be driven based on the received signal.

The main outlet port damper 130 is configured to open and close the main outlet port 113. The main outlet port damper 130 maintains the main outlet port 113 while being closed during the contaminated air is circulated and purified through the regenerative circulation pipe 170 in the main passage section 111. The main outlet port damper 130 opens the main outlet port 113, such that the purified air is discharged to the outside.

The main outlet port damper 130 may include a damper blade 131 rotatably installed by a damper shaft 132 in the main outlet port 113, and may be configured to open and close an outlet passage by a damper rotation motor 133. Whether the damper blade 131 is opened or closed may be detected by a proximity sensor 134, and the detected signal is input to the controller 190.

The bypass damper 140 is configured to open and close the bypass passage section 116. During normal operation of the main inlet port damper 120 or the main outlet port damper 130, the bypass damper 140 maintains the bypass passage section 116 while being closed. If a malfunction of the main inlet port damper 120 or the main outlet port damper 130 occurs, the bypass damper 140 opens the bypass passage section 116 to discharge indoor air to the outside.

The bypass damper 140 may include a damper blade 141 rotatably installed by a damper shaft 142 in the bypass passage section 116, and may be configured to open and close a bypass passage by a damper rotation motor 143. Whether the damper blade 141 is opened or closed may be detected by a proximity sensor 144, and the detected signal is input to the controller. The above-described proximity sensors 124, 134, and 144, and the damper rotation motors 123, 133, and 143 may be electrically connected to the controller 190 through a distribution board 191.

The damper blade 141 of the bypass damper 140 may be disposed on one side of the bypass inlet port 117 side and the bypass outlet port 118 side. Preferably, the damper blade 141 of the bypass damper 140 is installed on the bypass inlet port 117 side whose temperature is lower than the bypass outlet port 118 side with a high temperature due to hot air when the air is regenerated by the filter 150.

The filter 150 is disposed in the main passage section 111. The filter 150 collects and removes foreign particulate matters from the contaminated air in the main passage section 111. The filter 150 is disposed in such a way that both ends thereof face the main inlet port 112 and the main outlet port 113, in a state in which an outer circumferential portion thereof maintains airtightness with an inner circumferential portion of the main passage section 111. The filter 150 may be provided with a plurality of flow passages through which the contaminated air introduced into the main passage section 111 passes. Herein, the flow passages may be arranged parallel to each other in the length direction of the filter 150, and may be partitioned by filter partition walls.

The filter 150 is made of a porous material to collect particulates contained in the contaminated air. For example, the filter 150 may include a ceramic honeycomb made of at least one of a porous ceramic material such as silicon carbide (SiC), cordierite, and alumina. Alternatively, the filter 150 may include a ceramic nonwoven filter formed of ceramic fibers made of the same material as described above.

The filter 150 may be coated with a catalyst. The catalyst of the filter 150 serves to break down the particulate matters collected in the filter 150 into small molecules and convert them into a gas. In addition, the catalyst of the filter 150 serves to decrease a combustion temperature in order to burn the foreign matters collected in the filter 150 by the heater 160.

An oxidation catalyst 156 may be installed in the regenerative circulation pipe 170. The oxidation catalyst 156 may include metal oxides such as platinum (Pt), palladium (Pd), rhodium (Rh) and the like. The oxidation catalyst 156 may serve to oxidize the gas broken down by the catalyst of the filter 150 into gases of $CO_2$, $H_2O$, and NOx.

In addition, an oxidation reaction by the oxidation catalyst 156 is an exothermic reaction, which reduces a burden on a second heater unit 162 to be described below, such that an amount of used power may be decreased. The oxidation catalyst 156 may be coated on an additional filter made of a material such as ceramic honeycomb. The additional filter may collect and remove smoke which is incompletely burned in the regenerative circulation pipe 170.

The heater 160 is configured to heat the filter 150. The heater 160 serves to remove the foreign matters collected in the filter 150 and supply an amount of heat required for regeneration treatment. The heater 160 may be controlled and driven by the controller 190. The heater 160 may include a first heater unit 161 and the second heater unit 162.

The first heater unit 161 may be installed in the main passage section 111 to heat at least one end of the filter 150. The first heater unit 161 may be a heater using an electric heating wire or a heater using a microwave. As another example, the first heater unit 161 may be a filter heated in a planar heating method.

The second heater unit 162 may be installed in the regenerative circulation pipe 170 to heat the air in the regenerative circulation pipe 170. The second heater unit 162 may be a heater which is heated using an electric heating wire. The air heated by the second heater unit 162 is returned into the main passage section 111 by a circulation fan 180 to be described below, and passes through the filter 150 to heat the filter 150.

Accordingly, the foreign matters such as soot collected in the filter 150 may be burned and removed, and odors in the contaminated air may also be removed. At this time, since the oxidation reaction by the oxidation catalyst 156 installed in the regenerative circulation pipe 170 is an exothermic reaction, an amount of energy required to be supplied by the second heater unit 162 is remarkably reduced, and an amount of power used may be greatly decreased.

Both ends of the regenerative circulation pipe 170 are disposed on the main inlet port 112 side and the main outlet port 113 side, respectively, to be communicated with the main passage section 111. Accordingly, the air introduced into the main passage section 111 may be circulated through the main passage section 111 and the regenerative circulation pipe 170.

The regenerative circulation pipe 170 may be opened and closed by a circulation pipe damper 176. The circulation pipe damper 176 is operated by the controller in relation to the main inlet port damper 120 and the main outlet port damper 130 to maintain the regenerative circulation pipe 170 while being closed when the inlet and outlet passages are opened. The circulation pipe damper 176 may include a damper blade rotatably installed by a damper shaft in the regenerative circulation pipe 170, and may be configured to open and close a circulation passage by a damper rotation motor.

Whether the damper blade is opened or closed may be detected by the proximity sensor, and the detected signal is input to the controller 190. The damper blade of the circulation pipe damper 176 may be disposed to open and close an end of the regenerative circulation pipe 170 on the main outlet port side. The proximity sensor of the circulation pipe damper 176 and the damper rotation motor may be electrically connected to the controller 190 through the distribution board 191.

The circulation fan 180 is installed in the regenerative circulation pipe 170 to blow air in the regenerative circulation pipe 170 into the main passage section 111. The circulation fan 180 serves to blow the air heated by the second heater unit 162 in the regenerative circulation pipe 170 into the main passage section 111, and allow the air in the main passage section 111 to be sucked into the regenerative circulation pipe 170. In this process, as the air heated by the second heater unit 162 is circulated and supplied to an entire area of the filter 150, foreign matters collected in the filter 150 may be evenly removed, and the filter 150 may be regenerated. Accordingly, the troublesome work for frequently replacing the filter 150 may be reduced.

With the main inlet port 112 being closed, an indoor pressure may be lower than a pressure on the main inlet port side in the main passage section 111. In this case, the circulation fan 180 sucks air into the regenerative circulation pipe 170 from the end of the regenerative circulation pipe 170 on the main inlet port side, and sends it into the main passage section 111 through the end of the regenerative circulation pipe 170 on the main outlet port side, such that the pressure on the main inlet port side in the main passage section 111 may be reduced. Thus, it is possible to prevent air in the main passage section 111 from leaking into the room.

Meanwhile, during the contaminated air is circulated and purified through the regenerative circulation pipe 170, the circulation fan 180 is intermittently operated to suck air from the end of the regenerative circulation pipe 170 on the main outlet port side, and blow it through the end of the regenerative circulation pipe 170 on the main inlet port side, such that a direction in which the air is circulated may be reversed.

When the main passage section 111 is closed due to a malfunction of the main inlet port damper 120 or the main outlet port damper 130, the controller 190 controls the bypass damper 140 to open the bypass passage section 116. Herein, after the main inlet port damper 120 and the main outlet port damper 130 are operated to open the main passage, when continuously receiving a detection signal indicating that the main inlet port damper 120 or the main outlet port damper 130 is closed for a preset time, the controller 190 determines that the main passage section 111 is closed and operates the bypass damper 140 to open the bypass passage.

The controller 190 may be electrically connected to an operation panel 196 located on the room side by wired or wireless communication. The operation panel 196 may be provided with a button that allows a user to input commands such as a power on/off command, a filtering on/off command and the like. The operation panel 196 may be formed as a touch panel for inputting commands in a touch manner.

For example, as shown in FIG. 8, when an ON command is input by pressing a filtering button provided on the operation panel 196 by the user, the controller 190 outputs command signals for opening the inlet and out passages to the main inlet port damper 120 and the main outlet port damper 130.

After the preset time elapses, when receiving signals for opening the main inlet port damper 120 and the main outlet port damper 130 from the proximity sensors 124 and 134 of the main inlet port damper 120 and the main outlet port damper 130, the controller 190 determines that the main inlet port damper 120 and the main outlet port damper 130 are operating normally, and drives the exhaust fan 40 to discharge the indoor air to the outside.

When continuously receiving signals for closing the main inlet port damper 120 and the main outlet port damper 130 from the proximity sensors 124 and 134 of the main inlet port damper 120 and the main outlet port damper 130, the controller 190 determines that the main inlet port damper 120 and the main outlet port damper 130 are malfunctioning, and then drives the bypass damper 140 to open the bypass passage section 116, and drives the exhaust fan 40 to discharge the indoor air to the outside. Accordingly, even in a situation in which the main passage section 111 is abnormally closed due to a malfunction occurring in the main inlet port damper 120 or the main outlet port damper 130, a damage may be minimized by immediately enabling restaurant business to continue.

Next, an example of an operation of the above-described air purification device 100 will be described.

In a situation in which the main inlet port damper 120 and the main outlet port damper 130 are normally operated, as shown in FIG. 5, the bypass passage section 116 is closed by the bypass damper 140. During the daytime business when there is a relatively large amount of contaminated air generated in the room, the main inlet port 112 of the main passage section 111 is opened by the main inlet port damper 120, and the main outlet port 113 of the main passage section 111 is opened by the main outlet port damper 130, whereas the regenerative circulation pipe 170 is closed by the circulation pipe damper 176. In this state, the contaminated air in the room is introduced into the main passage section 111 through the main inlet port 112 by the exhaust fan 40. The contaminated air introduced into the main passage section 111 is filtered through the filter 150, and then is discharged from the main outlet port 113.

During the night time period when there is relatively little contaminated air generated in the room, as shown in FIG. 6, the main inlet port 112 of the main passage section 111 is closed by the main inlet port damper 120, and the main outlet port 113 of the main passage section 111 is closed by the main outlet port damper 130, whereas the regenerative circulation pipe 170 is opened by the circulation pipe damper 176. In this state, the filter 150 is heated by the first heater unit 161.

Further, after the air in the main passage section 111 is sucked into the regenerative circulation pipe 170 by the circulation fan 180, the air is heated by the second heater unit 162 and blown into the main passage section 111. At this time, the surrounding air is oxidized by the oxidation catalyst 156 in the regenerative circulation pipe 170. The heated air blown into the main passage section 111 heats the filter 150 to a high temperature. At this time, as foreign matters such as soot collected in the filter 150 during the daytime period are burned and removed, the filter 150 may be regenerated, and the air in the main passage section 111 may be purified again. When the purification of the air in the main passage section 111 is completed, the main outlet port 113 is opened by the main outlet port damper 130, such that the purified air may be discharged to the outside.

Meanwhile, in a state in which the main inlet port damper 120 and the main outlet port damper 130 are closed for regeneration of the filter 150, when a failure occurs or the main passage section 111 is abnormally closed due to a malfunction during the daytime business, as shown in FIG. 7, the controller operates the bypass damper 140 to open the bypass passage section 116. Thus, indoor air may be discharged to the outside through the open bypass passage section 116. As a result, the restaurant business may be continuously carried out by preventing the restaurant business from being suspended until the main inlet port damper 120 or the main outlet port damper 130 is repaired.

Figure 9:
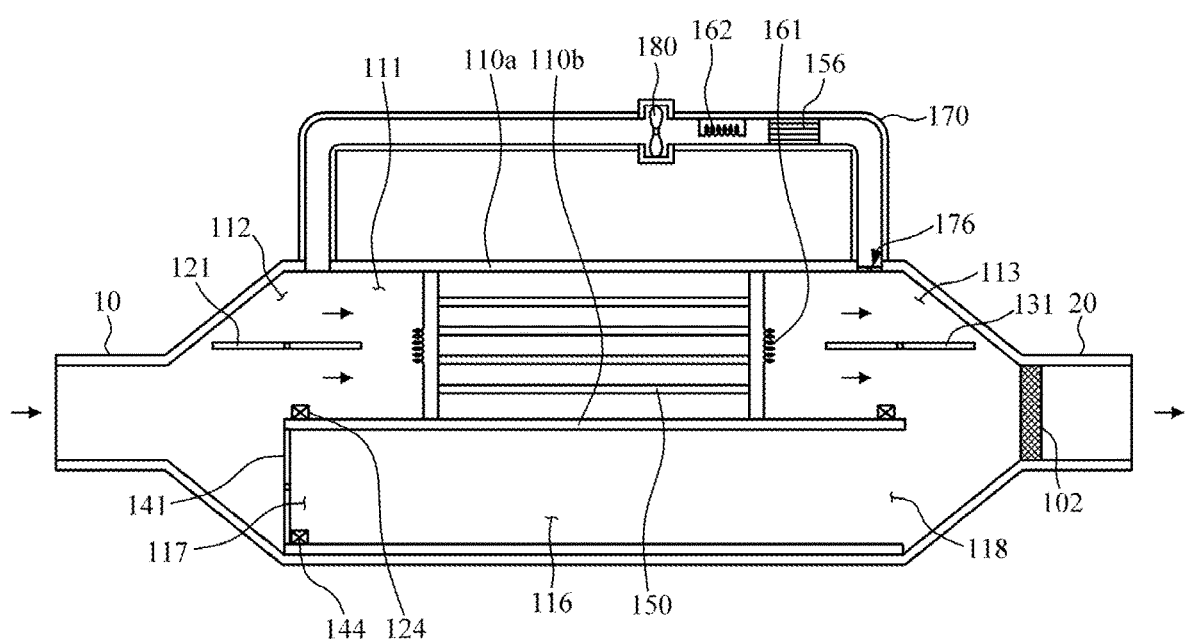
FIG. 9 is a cross-sectional view illustrating an example in which ceramic filters are mounted on the main outlet port and the bypass outlet port of the housing.

Meanwhile, as shown in FIG. 9, the air purification device 100 may include ceramic filters 102 mounted on the main outlet port 113 and the bypass outlet port 118 of the housing 110. The ceramic filters 102 may remove particulates and/or odors contained in the air discharged through the main outlet port 113 and the bypass outlet port 118. Accordingly, the ceramic filter 102 may further enhance the effect of purifying air by additionally removing the particulates and/or odors remaining in the air even after passing through the filter 150.

The ceramic filter 102 may include a ceramic fiber HEPA filter for removing particulates in the air, a ceramic odor removal filter for removing odors in the air, or may include both the ceramic fiber HEPA filter and the ceramic odor removal filter. The ceramic filter 102 may be self-cleaned by heat generated while the filter 150 is regenerated.

Figure 10:
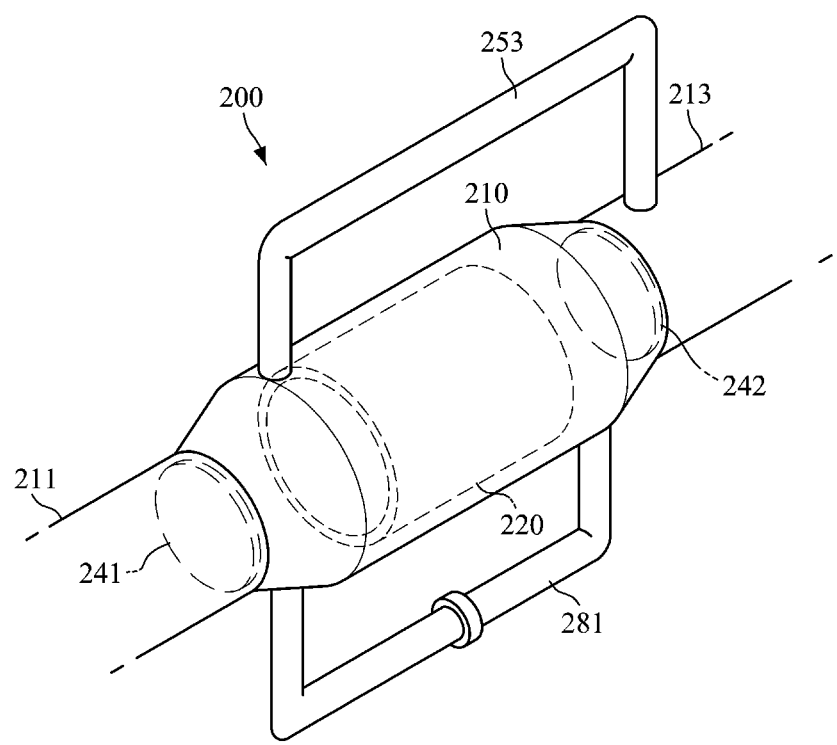
FIG. 10 is a perspective view illustrating an air purification device according to a second embodiment of the present invention.
Figure 11:
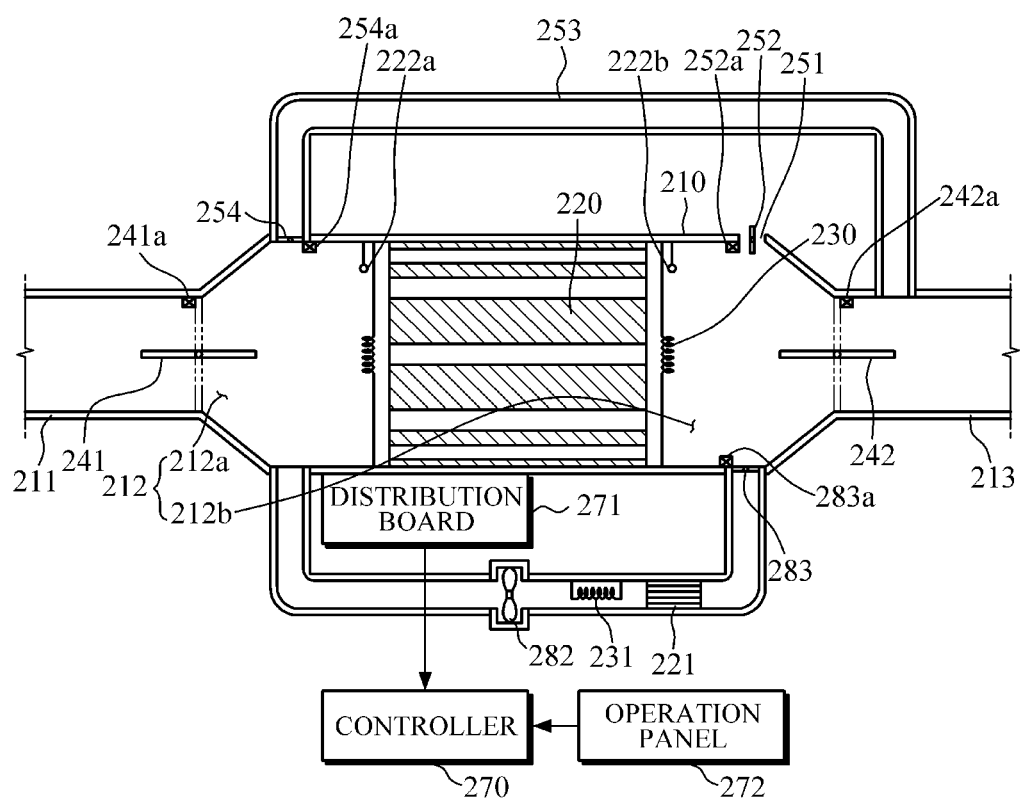
FIG. 11 is a cross-sectional view of the air purification device shown in FIG. 10 taken on a line in the length direction of the housing.

FIG. 10 is a perspective view illustrating an air purification device according to a second embodiment of the present invention, and FIG. 11 is a cross-sectional view of the air purification device shown in FIG. 10 taken on a line in the length direction of the housing.

Referring to FIGS. 10 and 11, an air purification device 200 according to the second embodiment of the present invention includes a housing 210, a filter 220, a heater 230, an inlet pipe damper 241, an outlet pipe damper 242, and a backwash intake port 251, an intake port damper 252, a backwash pipe 253, a backwash pipe damper 254, and a controller 270.

Air introduced into a passage section 212 from a room through an inlet pipe 211 of the housing 210 by the exhaust fan 40 (see FIG. 1) is discharged to an outside through an outlet pipe 213. The inlet pipe 211 is communicated with the inlet duct 10 (see FIG. 1) so that the contaminated air may be introduced. The outlet pipe 213 may be communicated with the outlet duct 20 (see FIG. 1) to discharge air purified by the filter 220.

The passage section 212 has a filter mounting space, an inlet space 212a communicating with the inlet pipe 211 on one side of the filter mounting space, and an outlet space 212b communicating with the outlet pipe 213 on the other side of the filter mounting space. The housing 210 is illustrated in a shape having a circular cross section, but may be formed in various shapes such as a shape having a rectangular cross section.

The housing 210 includes the backwash intake port 251 formed on the outlet space 212b side. The filter 220 is disposed in such a way that an inlet end thereof faces an outlet of the inlet pipe 211 and an outlet end thereof faces an inlet of the outlet pipe 213. Therefore, the backwash intake port 251 allows external air to be sucked into an outlet end side of the filter 220 through the outlet space 212b of the passage section 212 for backwashing the filter 220, based on that air purification is performed by the filter 220.

The filter 220 is mounted in the filter mounting space of the passage section 212. The filter 220 collects and removes foreign particulate matters from the contaminated air in passage section 212. The filter 220 is disposed in such a way that both ends thereof face the inlet of the inlet pipe 211 and the outlet of the outlet pipe 213, in a state in which an outer circumferential portion thereof maintains airtightness with an inner circumferential portion of the passage section 212. That is, the filter 220 is disposed in such a way that the inlet end thereof faces the inlet space 212a and the outlet end thereof faces the outlet space 212b.

The filter 220 may be provided with a plurality of flow passages through which the contaminated air introduced into the passage section 212 passes. Herein, the flow passages may be arranged parallel to each other in the length direction of the filter, and may be partitioned by filter partition walls.

The filter 220 is made of a porous material to collect particulates contained in the contaminated air. For example, the filter 220 may include a ceramic honeycomb made of at least one of a porous ceramic material such as silicon carbide (SiC), cordierite, and alumina. Alternatively, the filter 220 may include a ceramic nonwoven filter formed of ceramic fibers made of the same material as described above.

The filter 220 may be coated with a catalyst. The catalyst of the filter 220 serves to break down the particulate matters collected in the filter 220 into small molecules and convert them into a gas. In addition, the catalyst of the filter 220 serves to decrease a combustion temperature in order to burn the foreign matters collected in the filter 220 by the heater 230.

The heater 230 is configured to heat the filter 220. The heater 230 serves to remove the foreign matters collected in the filter 220 and supply an amount of heat required for regeneration treatment of the filter 220. Herein, the heater 230 may remove the foreign matters such as soot collected in the filter 220 and also remove odors in the contaminated air by burning.

The heater 230 may be controlled and driven by the controller 270. The heater 230 may be installed in the passage section 212 to heat at least one end of the filter 220. The heater 230 may be a heater using an electric heating wire or a heater using a microwave. As another example, the heater 230 may be a filter 220 heated in a planar heating method. The heater 230 may correspond to the first heater unit of the above-described embodiment.

The inlet pipe damper 241 is configured to open and close the outlet of the inlet pipe 211. The inlet pipe damper 241 opens the outlet of the inlet pipe 211, thereby allowing the contaminated air of the room to be introduced into the passage section 212. During backwashing the filter 220, the inlet pipe damper 241 maintains the outlet of the inlet pipe 211 while being closed. During discharging the indoor air to the outside through the backwash pipe 253, the inlet pipe damper 241 may maintain the outlet of the inlet pipe 211 while being closed. During additionally regenerating and purifying the regenerated contaminated air generated in a regeneration process of the filter 220 while circulating it in the passage section 212 through the regenerative circulation pipe 281, which will be described below, the inlet pipe damper 241 maintains the outlet of the inlet pipe 211 while being closed.

The inlet pipe damper 241 may include a damper blade rotatably installed by a damper shaft in the outlet of the inlet pipe 211, and may be configured to open and close the inlet passage by a damper rotation motor. Whether the damper blade is opened or closed may be detected by a proximity sensor 241a.

The proximity sensor 241a may include a Hall sensor and a permanent magnet, or may be optically configured to detect opening/closing positions of the damper blade 121 in a non-contact manner. The signal detected by the proximity sensor 241a may be input to the controller 270. The controller 270 may receive the signal detected by the proximity sensor 241a and control the damper rotation motor to be driven based on the received signal.

The outlet pipe damper 242 is configured to open and close the inlet of the outlet pipe 213. The outlet pipe damper 242 opens the inlet of the outlet pipe 213 so that the purified air is discharged. During backwashing the filter 220, the outlet pipe damper 242 maintains the inlet of the outlet pipe 213 while being closed. During discharging the indoor air to the outside through the backwash pipe 253, the outlet pipe damper 242 may also maintain the outlet pipe 213 while being closed. During additionally regenerating and purifying the regenerated contaminated air generated in the regeneration process of the filter 220 while circulating it in the passage section 212 through the regenerative circulation pipe 281, the outlet pipe damper 242 maintains the inlet of the outlet pipe 213 while being closed.

The outlet pipe damper 242 may include a damper blade rotatably installed by a damper shaft in the inlet of the outlet pipe 213, and may be configured to open and close an outlet passage by a damper rotation motor. Whether the damper blade is opened or closed may be detected by a proximity sensor 242a, and the detected signal is input to the controller 270.

The intake port damper 252 is configured to open and close the backwash intake port 251. During backwashing the filter 220, the intake port damper 252 opens the backwash intake port 251 so as to allow external air to be sucked through the opened backwash intake port 251. During purifying the indoor contaminated air by the filter 220, or additionally regenerating and purifying the regenerated contaminated air generated in the regeneration process of the filter 220 while circulating it in the passage section 212 through the regenerative circulation pipe 281, the intake port damper 252 maintains the backwash intake port 251 while being closed.

The intake port damper 252 may include a damper blade rotatably installed by a damper shaft in the backwash intake port 251, and may be configured to open and close the passage by a damper rotation motor. Whether the damper blade is opened or closed may be detected by a proximity sensor 252a, and the detected signal is input to the controller 270.

One end of the backwash pipe 253 is communicated with the inlet space 212a of the passage section 212, and the other end is communicated with the outlet pipe 213. With the outlet of the inlet pipe 211 and the inlet of the outlet pipe 213 being closed, the backwash pipe 253 allows external air that has passed through the filter 220 from the backwash intake port 251 to be introduced from the inlet end of the filter 220 by the suction force of the exhaust fan 40, and then to be discharged to the outside.

This backwash pipe 253 works with the backwash intake port 251 as follows. In the process of collecting foreign matters in the indoor air by the filter 220, ash may be accumulated in the filter 220. For example, the ash accumulated in the filter 220 may contain metal components such as calcium (Ca), magnesium (Mg), and zinc (Zn), but the metal components of these ash are not completely removed during the regeneration process of the filter 220, such that these components are continuously accumulated in the filter 220. As a result, the filter 220 may be clogged, thereby the filter 220 may not function properly.

As such, when the filter 220 is clogged, the external air is sucked into the outlet space 212b through the backwash intake port 251 by the suction force of the exhaust fan 40 acting on the backwash pipe 253, then flows into the inlet space 212a via the inlet end of the filter 220 by passing in a reverse direction of the filter 220 from the outlet end of the filter 220, and the ash accumulated in the filter 220 is separated from the filter 220 by a force of external air passing through the filter 220. As a result, backwashing of the filter 220 may be performed.

Figure 12:
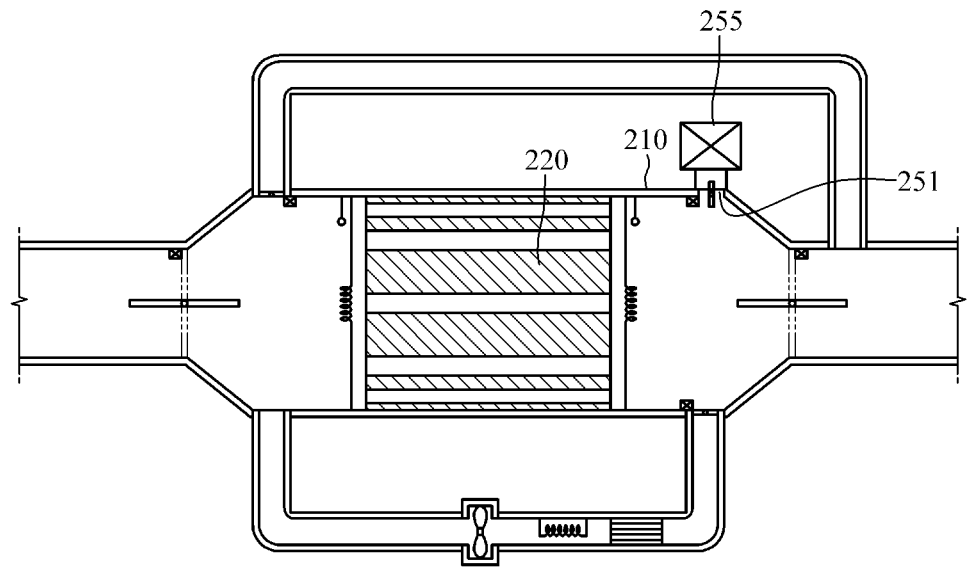
FIG. 12 is a cross-sectional view illustrating an example in which an air jet is provided in the backwash intake port in FIG. 11.

Additionally, as shown in FIG. 12, an air jet 255 may be mounted in the backwash intake port 251. The air jet 255 injects compressed air through the backwash intake port 251, such that the filter 220 may be effectively backwashed by an injection force of the compressed air.

The air jet 255 is configured to generate high-frequency vibration in the compressed air by a vibrator or the like, such that backwashing of the filter 220 may be more effectively performed through the high-frequency vibration. The air jet 255 may be controlled and driven by the controller 270.

The backwash pipe damper 254 is configured to open and close the inlet of the backwash pipe 253. During backwashing the filter 220, the backwash pipe damper 254 opens the inlet of the backwash pipe 253 so as to allow the air that has passed while washing the filter 220 to be introduced and discharged to the outside. During purifying the indoor contaminated air by the filter 220, or additionally regenerating and purifying the regenerated contaminated air generated in the regeneration process of the filter 220 while circulating it in the passage section 212 through the regenerative circulation pipe 281, the backwash pipe damper 254 maintains the inlet of the backwash pipe 253 while being closed. During discharging the indoor air to the outside through the backwash pipe 253, the backwash pipe damper 254 may maintain the inlet of the backwash pipe 253 while being closed.

The backwash pipe damper 254 may include a damper blade rotatably installed by a damper shaft in the inlet of the backwash pipe 253, and may be configured to open and close the passage by a damper rotation motor. Whether the damper blade is opened or closed may be detected by a proximity sensor 254a, and the detected signal is input to the controller 270. The above-described proximity sensors 241a, 242a, 252a, and 254a, and the damper rotation motors may be electrically connected to the controller 270 through a distribution board 271.

When a clogging phenomenon of the filter 220 occurs, the controller 270 controls the inlet pipe damper 241 and the outlet pipe damper 242 to close the outlet of the inlet pipe 211 and the inlet of the outlet pipe 213, and in this state, controls the intake port damper 252 and the backwash pipe damper 254 to open the backwash intake port 251 and the inlet of the backwash pipe 253.

The controller 270 may be electrically connected to an operation panel 272 located on the room side by wired or wireless communication. The operation panel 272 may be provided with a button that allows a user to input commands such as a power on/off command, a filtering on/off command and the like. The operation panel 272 may be formed as a touch panel for inputting commands in a touch manner.

For example, the controller 270 may be operated as follows. Pressure sensors 222a and 222b are disposed before and after the filter 220 to measure a pressure of an inlet end and a pressure of an outlet end of the filter 220. When ash is accumulated in the filter 220, a pressure difference occurs between the inlet and outlet ends of the filter 220. The controller 270 receives the pressure measured by the pressure sensors 222a and 222b.

When the pressure difference between the inlet end and the outlet end of the filter 220 is a preset pressure or more, the controller 270 may determine that the clogging phenomenon of the filter 220 occurs. Then, the controller 270 opens the backwash intake port 251 and the inlet of the backwash pipe 253 in a state in which the outlet of the inlet pipe 211 and the inlet of the outlet pipe 213 are closed. Thereby, external air is sucked from the backwash intake port 251 by the suction force of the exhaust fan 40 acting on the backwash pipe 253, and then passes through the filter 220 in a reverse direction to be washed.

When the pressure difference between the inlet end and the outlet end of the filter 220 is lower than the preset pressure and reaches a target pressure during the backwashing process of the filter 220 for a preset time, the controller 270 may determine that the clogging phenomenon of the filter 220 has been resolved. Then, the controller 270 controls to stop backwashing of the filter 220 by closing the backwash intake port 251 and the inlet of the backwash pipe 253. Herein, the target pressure corresponds to a pressure enough to reuse the filter 220.

Meanwhile, the air purification device may include a regenerative circulation pipe 281, a circulation fan 282, and a circulation pipe damper 283. Both ends of the regenerative circulation pipe 281 are communicated with the inlet space 212a and the outlet space 212b of the passage section 212, respectively. Accordingly, the air introduced into the passage section 212 may be circulated through the passage section 212 and the regenerative circulation pipe 281.

The circulation fan 282 is installed in the regenerative circulation pipe to blow air in the regenerative circulation pipe 281 into the passage section 212. The circulation fan 282 is operated to blow air heated by an additional heater 231 to be described below in the regenerative circulation pipe 281 into the passage section 212, and suck the air in the passage section 212 into the regenerative circulation pipe 281. In this process, as the air heated by the additional heater 231 is circulated and supplied to the entire area of the filter 220, foreign matters collected in the filter 220 may be evenly removed, and the filter 220 may be regenerated. Thereby, a troublesome work for frequently replacing the filter 220 may be reduced.

With the outlet of the inlet pipe 211 being closed, the indoor pressure may be lower than the pressure in the inlet space 212a of the passage section 212. In this case, air is sucked into the regenerative circulation pipe 281 from the inlet space 212a of the passage section 212 through an end of the regenerative circulation pipe 281 on the inlet space 212a side by the circulation fan 282, and is blown into the outlet space 212b of the passage section 212 through the end of the regenerative circulation pipe 281 on the outlet space 212b side, thereby reducing the pressure in the inlet space 212a of the passage section 212. Thus, it is possible to prevent the air in the passage section 212 from leaking into the room.

In addition, during purifying the contaminated air by circulating through the regenerative circulation pipe 281, the circulation fan 282 is operated to intermittently suck air from the end of the regenerative circulation pipe 281 on the outlet space 212b side, and blow it through the end of the regenerative circulation pipe 281 on the inlet space 212a side, thereby it is also possible to reverse the direction of air circulation.

The circulation pipe damper 283 is configured to open and close the regenerative circulation pipe 281. During additionally regenerating and purifying the regenerated contaminated air generated in the regeneration process of the filter 220 while circulating it in the passage section 212 through the regenerative circulation pipe 281, the circulation pipe damper 283 opens the regenerative circulation pipe 281. During purifying the indoor contaminated air by the filter 220 or backwashing the filter 220, the circulation pipe damper 283 maintains the regenerative circulation pipe 281 while being closed.

The circulation pipe damper 283 may include a damper blade rotatably installed by a damper shaft in the regenerative circulation pipe 281, and may be configured to open and close the circulation passage by a damper rotation motor. Whether the damper blade is opened or closed may be detected by a proximity sensor 283a, and the detected signal is input to the controller 270. The damper blade of the circulation pipe damper 283 may be disposed to open and close the end of the regenerative circulation pipe 281 on the outlet space 212b side. The proximity sensor 283a of the circulation pipe damper 283 and the damper rotation motor may be electrically connected to the controller 270 through the distribution board 271.

The additional heater 231 may be installed in the regenerative circulation pipe 281 to heat the air in the regenerative circulation pipe 281. The additional heater 231 may be a heater using an electric heating wire. The air heated by the additional heater 231 is blown into the passage section 212 by the circulation fan 282, and may heat the filter 220 while passing through the filter 220. Accordingly, foreign matters such as soot collected in the filter 220 may be burned and removed, and odors in the regenerated contaminated air may also be removed. The additional heater 231 may correspond to the second heater unit of the above-described embodiment.

The oxidation catalyst 221 may be installed in the regenerative circulation pipe 281. The oxidation catalyst 221 may include metal oxides such as platinum (Pt), palladium (Pd), rhodium (Rh) and the like. The oxidation catalyst 221 may serve to oxidize the gas broken down by the catalyst of the filter 220 into gases of $CO_2$, $H_2O$, and NOx.

In addition, an oxidation reaction by the oxidation catalyst 221 is an exothermic reaction, which reduces a burden on the additional heater 231, such that an amount of used power may be decreased. The additional filter made of a material such as ceramic honeycomb may be coated with oxidation catalyst 221. The additional filter may collect and remove smoke which is incompletely burned in the regenerative circulation pipe 281.

Figure 13:
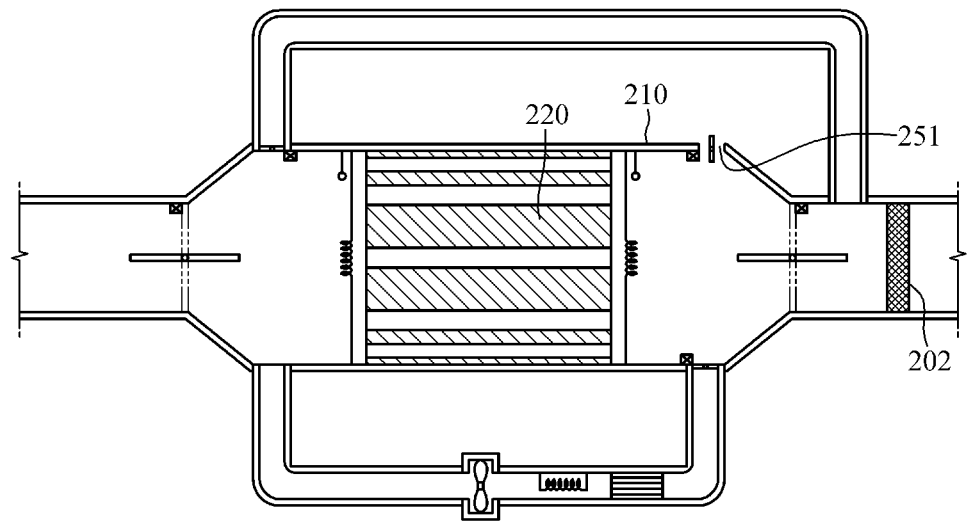
FIG. 13 is a cross-sectional view illustrating an example in which a ceramic filter is mounted in the outlet pipe in FIG. 11.

In addition, as shown in FIG. 13, the air purification device 200 may include a ceramic filter 202 mounted in the outlet pipe 213. The ceramic filter 202 may remove particulates and/or odors contained in the air discharged through the outlet pipe 213. Accordingly, the ceramic filter 202 may further enhance the effect of purifying air by additionally removing the particulates and/or odors remaining in the air even after passing through the filter 220.

The ceramic filter 202 may include a ceramic fiber HEPA filter for removing particulates in the air, a ceramic odor removal filter for removing odors in the air, or may include both the ceramic fiber HEPA filter and the ceramic odor removal filter. The ceramic filter 202 may be self-cleaned by heat generated while the filter 220 is regenerated.

Figure 14:
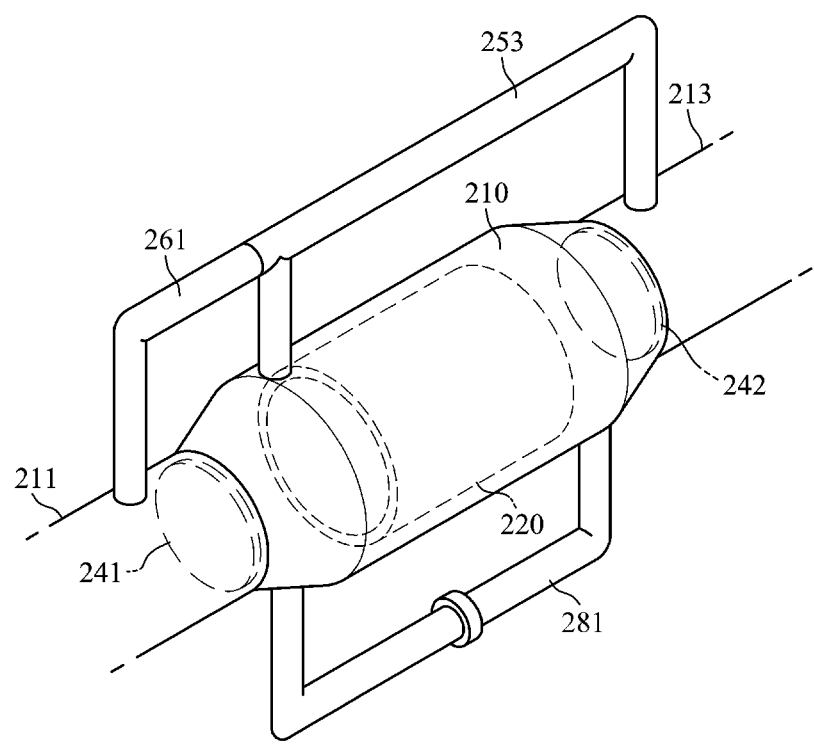
FIG. 14 is a perspective view illustrating an example in which the bypass pipe and the bypass damper are provided in FIG. 10.
Figure 15:
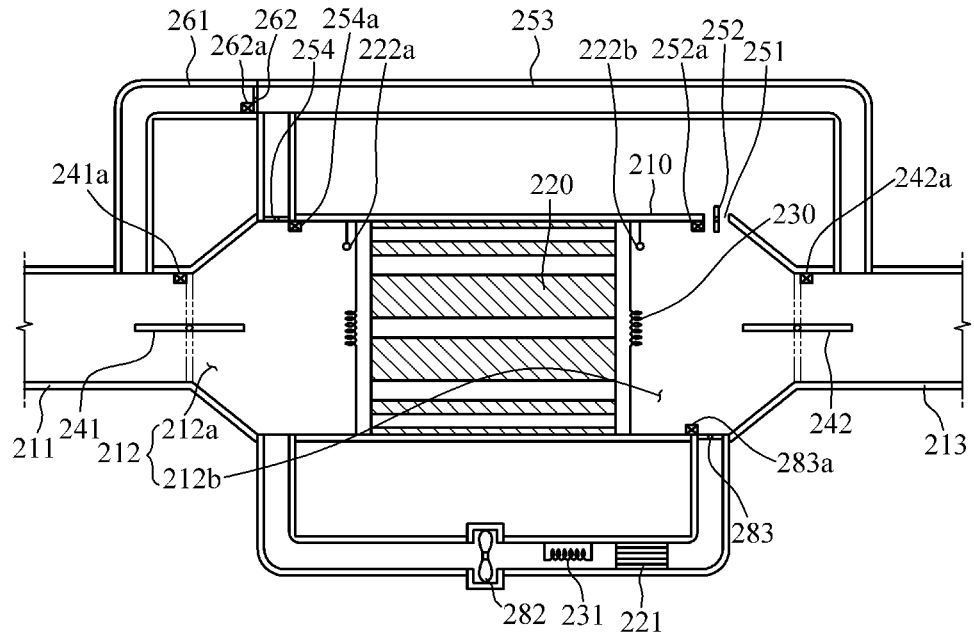
FIG. 15 is a cross-sectional view of the air purification device shown in FIG. 14 taken on a line in the length of the housing.

FIG. 14 is a perspective view illustrating an example in which the bypass pipe and the bypass damper are provided in FIG. 10, and FIG. 15 is a cross-sectional view of the air purification device shown in FIG. 14 taken on a line in the length of the housing.

Referring to FIGS. 14 and 5, one end of a bypass pipe 261 may be communicated with the inlet pipe 211, and the other end may be communicated with the backwash pipe 253. Air introduced into the bypass pipe 261 from the room through the inlet pipe 211 passes through the backwash pipe 253, and is discharged to the outside through the outlet pipe 213.

The bypass damper 262 may open and close the bypass pipe 261. During discharging the indoor air to the outside through the bypass pipe 261 and the backwash pipe 253, the bypass damper 262 opens the bypass pipe 261. During purifying the indoor contaminated air by the filter 220 or backwashing the filter 220, the bypass damper 262 maintains the bypass pipe 261 while being closed.

The bypass damper 262 may include a damper blade rotatably installed by a damper shaft in the bypass pipe 261, and may be configured to open and close the bypass passage by a damper rotation motor. Whether the damper blade is opened or closed may be detected by a proximity sensor 262a, and the detected signal is input to the controller 270. The proximity sensor 262a and the damper rotation motor may be electrically connected to the controller 270 through the distribution board 271. The damper blade of the bypass damper 262 may be disposed on the outlet side of the bypass pipe 261 connected to the backwash pipe 253, but may be disposed on the inlet side of the bypass pipe 261 connected to the inlet pipe 211.

The controller 270 selectively controls the bypass damper 262 to open the bypass pipe 261. For example, if the pressure difference between the inlet end and the outlet end of the filter 220 is not lower than the preset pressure in the backwashing process of the filter 220 for a preset time, the controller 270 may determine that the clogging phenomenon of the filter 220 has not been resolved. Then, the controller 270 opens the bypass pipe 261 in a state in which the outlet of the inlet pipe 211 and the inlet of the outlet pipe 213 are closed, so that the indoor air is discharged to the outside through the bypass pipe 261 and the backwash pipe 253. At this time, the controller 270 may close the inlet of the backwash pipe 253.

As described above, when the clogging phenomenon of the filter 220 is resolved by performing backwashing, the filter 220 may be reused. Therefore, not only the troublesome work for frequently replacing the filter 220 may be reduced, but also normal restaurant business may be continued.

If the clogging phenomenon of the filter 220 is not resolved even after performing backwashing, the indoor air may be discharged to the outside through the bypass pipe 261 and the backwash pipe 253 without passing through the filter 220, such that a damage may be minimized by immediately enabling restaurant business to continue. Thereafter, by replacing the filter 220, normal restaurant business may be continued.

In addition, after the inlet pipe damper 241 and the outlet pipe damper 242 are operated to open the inlet and outlet passages, when continuously receiving a detection signal indicating that the inlet pipe damper 241 or the outlet pipe damper 242 is closed for a preset time, the controller 270 determines that the passage section 212 is closed, and operates the bypass damper 262 to open the bypass passage.

For example, when a user inputs a command for turning on by pressing a filtering button provided on the operation panel 272, the controller 270 outputs command signals for opening to the inlet pipe damper 241 and the outlet pipe damper 242. After the preset time elapses, when receiving signals for opening the inlet pipe damper 241 and the outlet pipe damper 242 from the proximity sensors 241a and 242a of the inlet pipe damper 241 and the outlet pipe damper 242, the controller 270 determines that the inlet pipe damper 241 and the outlet pipe damper 242 are normally operated, and then drives the exhaust fan 40 to discharge the indoor air to the outside.

When continuously receiving signals for closing the inlet pipe damper 241 or the outlet pipe damper 242 from the proximity sensors 241a and 242a of the inlet pipe damper 241 and the outlet pipe damper 242 for a preset time, the controller 270 determines that the inlet pipe damper 241 and the outlet pipe damper 242 are malfunctioning, and then drives the bypass damper 262 to open the bypass pipe 261, and drives the exhaust fan 40 to discharge the indoor air to the outside. Accordingly, even in a situation in which the passage section 212 is abnormally closed due to the malfunction of the inlet pipe damper 241 or the outlet pipe damper 242, a damage may be minimized by immediately enabling restaurant business to continue.

Next, an example of an operation of the above-described air purification device 200 will be described with reference to FIGS. 16 to 19.

Figure 16:
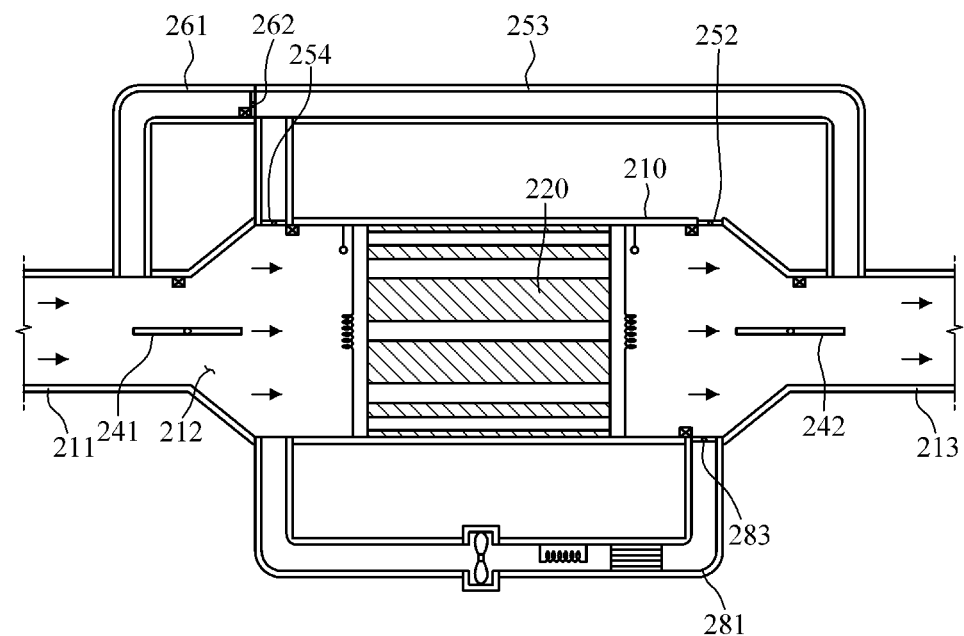
FIG. 16 is a cross-sectional view for describing a process of purifying air by the filter in FIG. 15.

During the daytime business when there is a relatively large amount of contaminated air generated in the room, as shown in FIG. 16, the outlet of the inlet pipe 211 is opened by the inlet pipe damper 241, and the inlet of the outlet pipe 213 is opened by the outlet pipe damper 242. The backwash intake port 251 is closed by the intake port damper 252, and the inlet of the backwash pipe 253 is closed by the backwash pipe damper 254. The bypass pipe 261 is closed by the bypass damper 262. Additionally, the regenerative circulation pipe 281 may be closed by the circulation pipe damper 283. In this state, the contaminated air in the room is introduced into the passage section 212 through the outlet of the inlet pipe 211 by the exhaust fan 40. The contaminated air introduced into the passage section 212 is filtered through the filter 220, and then is discharged to the outside through the inlet of the outlet pipe 213.

Figure 17:
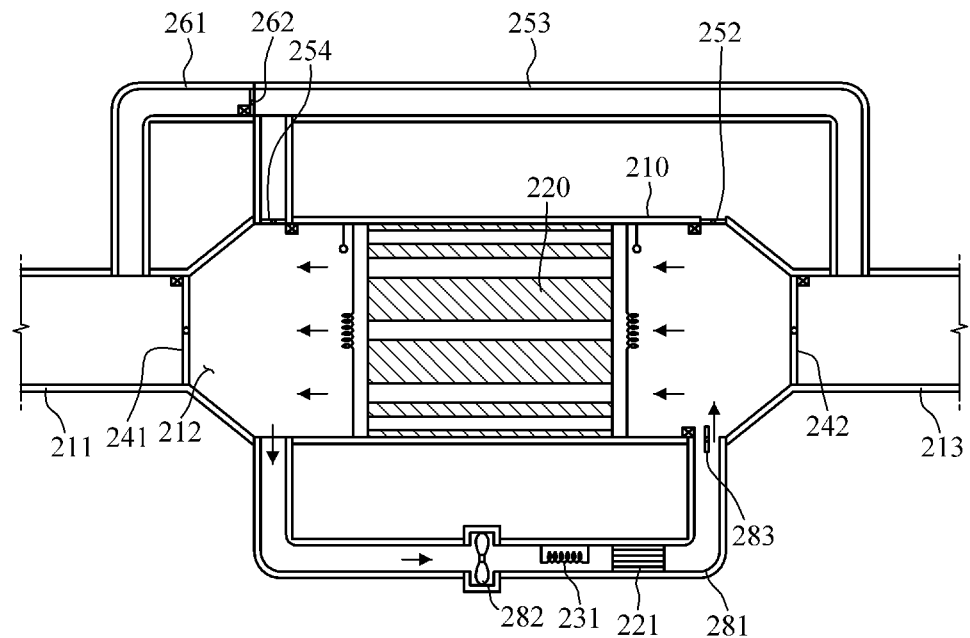
FIG. 17 is a cross-sectional view for describing a process of regenerating the filter in FIG. 15.

During the night time period when there is relatively little contaminated air generated in the room, as shown in FIG. 17, the outlet of the inlet pipe 211 is closed by the inlet pipe damper 241, and the inlet of the outlet pipe 213 is closed by the outlet pipe damper 242. At this time, the backwash intake port 251, the inlet of the backwash pipe 253, and the bypass pipe 261 are maintained while being closed. In this state, the filter 220 is heated by the heater 230. Accordingly, as foreign matters such as soot collected in the filter 220 during the daytime period are burned and removed, the filter 220 may be regenerated. In addition, odors in the contaminated air may also be removed.

Additionally, the regenerative circulation pipe 281 may be opened by the circulation pipe damper 283. Further, the air in the passage section 212 is sucked into the regenerative circulation pipe 281 by the circulation fan 282, and then the air may be heated by the additional heater 231 and be blown into the passage section 212. At this time, the surrounding air is oxidized by the oxidation catalyst 221 in the regenerative circulation pipe 281. The heated air blown into the passage section 212 heats the filter 220 to a high temperature. Accordingly, the filter 220 may be regenerated, and the regenerated contaminated air in the passage section 212 may be regenerated and purified again. When the additional regeneration and purification for the regenerated contaminated air in the passage section 212 is completed, the inlet of the outlet pipe 213 is opened by the outlet pipe damper 242, such that the purified air may be discharged to the outside.

Figure 18:
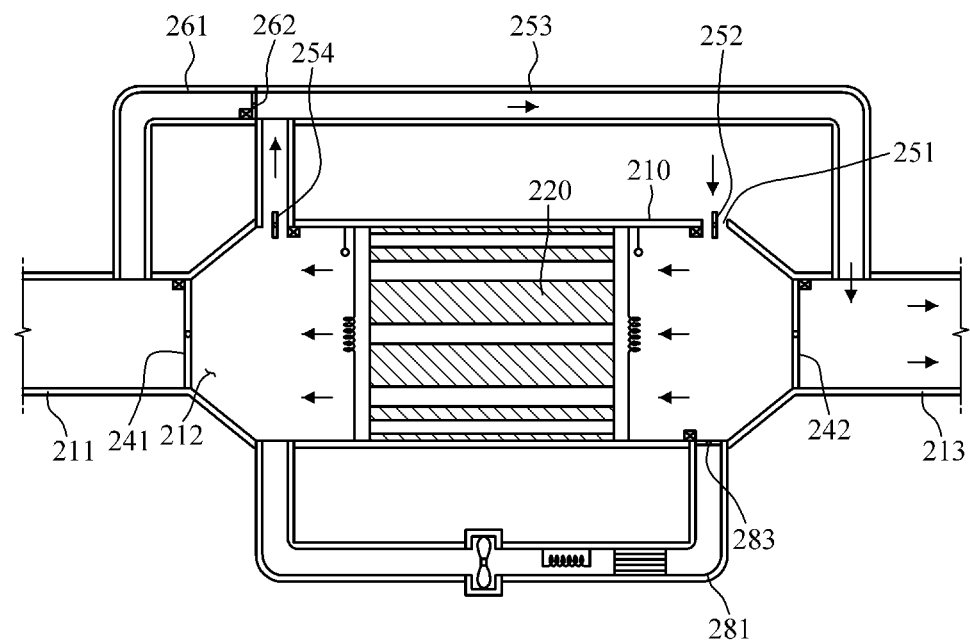
FIG. 18 is a cross-sectional view for describing a process of backwashing the filter in FIG. 15.

Meanwhile, if the clogging phenomenon of the filter 220 occurs, as shown in FIG. 18, the outlet of the inlet pipe 211 and the inlet of the outlet pipe 213 are closed, and the backwash intake port 251 and the inlet of the backwash pipe 253 are opened. Accordingly, external air is sucked through the backwash intake port 251 by the suction force of the exhaust fan 40 acting on the backwash pipe 253, and then is washed while passing through the filter 220 in the reverse direction. In this process, the clogging phenomenon of the filter 220 may be resolved by performing backwashing.

Figure 19:
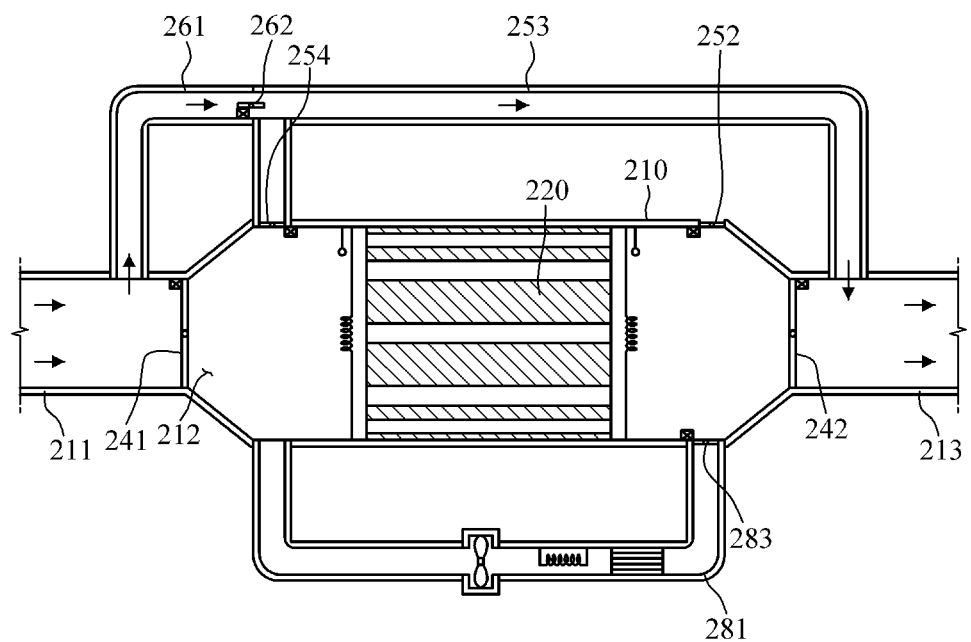
FIG. 19 is a cross-sectional view for describing a process of bypassing indoor air in FIG. 15.

If the clogging phenomenon of the filter 220 is not resolved even after performing backwashing, as shown in FIG. 19, in a state in which the outlet of the inlet pipe 211 and the inlet of the outlet pipe 213 are closed, the bypass pipe 261 is opened. Therefore, indoor air is discharged to the outside through the bypass pipe 261 and the backwash pipe 263 without passing through the filter 220.

As another situation, when a failure occurs in a state in which the inlet pipe damper 241 and the outlet pipe damper 242 are closed for regeneration or backwashing of the filter 220, or in a situation in which the passage section 212 is abnormally closed by a closing operation due to a malfunction during the daytime business, the bypass pipe 261 is opened by the bypass damper 262. Accordingly, indoor air may be discharged to the outside through the open bypass pipe 261 and the backwash pipe 263.

Although the present invention has been described with reference to the embodiments shown in the drawings, these are merely an example. It should be understood by persons having common knowledge in the technical field to which the present invention pertains that various modifications of the embodiments may be made. Accordingly, the real technical protection scope of the present invention is determined by the technical spirit of the appended claims.

The invention claimed is:

1. An air purification device comprising:
   a housing which comprises a main passage section through which air is introduced from a room through a main inlet port and is discharged to an outside through a main outlet port, and a bypass passage section partitioned from the main passage section, through which air is introduced from the room through a bypass inlet port and is discharged to an outside through a bypass outlet port;
   a main inlet port damper configured to open and close the main inlet port;
   a main outlet port damper configured to open and close the main outlet port;
   a bypass damper configured to open and close the bypass passage section;
   a filter disposed within the main passage section;
   a heater configured to heat the filter;
   a regenerative circulation pipe of which both ends are respectively disposed on the main inlet port side and the main outlet port side to communicate with the main passage section;
   a circulation fan installed in the regenerative circulation pipe to blow air in the regenerative circulation pipe into the main passage section; and
   a controller configured to control the bypass damper so as to open the bypass passage section when the main passage section is closed due to a malfunction of the main inlet port damper or the main outlet port damper,
   wherein, after the main inlet port damper and the main outlet port damper are operated to open the inlet and outlet passages, when continuously receiving a detection signal indicating that the main inlet port damper or the main outlet port damper is closed for a preset time, the controller determines that the main passage section is closed and operates the bypass damper to open the bypass passage.

2. The air purification device according to claim 1, wherein the bypass damper comprises a damper blade disposed on a side of the bypass inlet port to open and close the bypass passage section.

3. The air purification device according to claim 1, further comprising ceramic filters mounted on the main outlet port and the bypass outlet port of the housing.

4. An air purification device comprising:
a housing which comprises a passage section through which air is introduced from a room through an inlet pipe by an exhaust fan and is discharged to an outside through an outlet pipe, wherein the passage section has a filter mounting space, an inlet space communicated with the inlet pipe on one side of the filter mounting space, and an outlet space communicated with the outlet pipe on the other side of the filter mounting space, and a backwash intake port formed on the outlet space side;
a filter mounted in the filter mounting space of the passage section;
a heater configured to heat the filter;
an inlet pipe damper configured to open and close an outlet of the inlet pipe;
an outlet pipe damper configured to open and close an inlet of the outlet pipe;
an intake port damper configured to open and close the backwash intake port;
a backwash pipe of which one end is communicated with the inlet space of the passage section, and the other end is communicated with the outlet pipe;
a backwash pipe damper configured to open and close an inlet of the backwash pipe;
a controller configured to control the inlet pipe damper and the outlet pipe damper to close the outlet of the inlet pipe and the inlet of the outlet pipe when a clogging phenomenon of the filter occurs, and in this state, control the intake port damper and the backwash pipe damper to open the backwash intake port and the inlet of the backwash pipe;
a bypass pipe of which one end is communicated with the inlet pipe and the other end is communicated with the backwash pipe; and
a bypass damper configured to open and close the bypass pipe,
wherein the controller selectively controls the bypass damper to open the bypass pipe when the clogging phenomenon of the filter occurs, and
wherein after the inlet pipe damper and the outlet pipe damper are operated to open inlet and outlet passages, when continuously receiving a detection signal indicating that the inlet pipe damper or the outlet pipe damper is closed for a preset time, the controller determines that the passage section is closed, and operates the bypass damper to open bypass passage.

5. The air purification device according to claim 4, further comprising an air jet mounted in the backwash intake port to inject compressed air through the same.

6. The air purification device according to claim 4, further comprising:
a regenerative circulation pipe of which both ends are respectively communicated with the inlet space and the outlet space of the passage section;
a circulation fan installed in the regenerative circulation pipe to blow air in the regenerative circulation pipe into the passage section; and
a circulation pipe damper configured to open and close the regenerative circulation pipe.

7. The air purification device according to claim 4, further comprising a ceramic filter mounted in the outlet pipe.

* * * * *